United States Patent [19]

Pfaelzer

[11] 4,120,094
[45] Oct. 17, 1978

[54] MEASURING DEVICE FOR SPAGHETTI OR THE LIKE

[76] Inventor: Peter Pfaelzer, 50 Larry La., Oakland, Calif. 94611

[21] Appl. No.: 768,092

[22] Filed: Feb. 14, 1977

[51] Int. Cl.² ........................... G01B 5/00; G01B 5/26
[52] U.S. Cl. .................... 33/174 T; 33/1 V; 33/121
[58] Field of Search ............. 33/1 V, 121, 174 R, 33/174 H, 174 T; 73/149, 215

[56] References Cited

U.S. PATENT DOCUMENTS

| 937,589 | 10/1909 | Freeman, Jr. | 33/121 |
| 1,772,518 | 8/1930 | Pardini | 73/215 |
| 1,992,780 | 2/1935 | Skeats | 73/215 |
| 2,424,619 | 7/1947 | Keepers | 33/121 |
| 2,674,888 | 4/1954 | Simonet | 33/121 |
| 3,874,085 | 4/1975 | Atkins | 33/174 T |

FOREIGN PATENT DOCUMENTS

| 155,617 | 6/1963 | U.S.S.R. | 33/121 |

*Primary Examiner*—Richard R. Stearns
*Attorney, Agent, or Firm*—Bruce & McCoy

[57] ABSTRACT

A measuring device having a base member and two upright support members secured to the base member and marked with graduations whereby a quantity of uncooked noodles such as spaghetti placed on the base between the support members can be measured by comparison with said markings.

3 Claims, 3 Drawing Figures

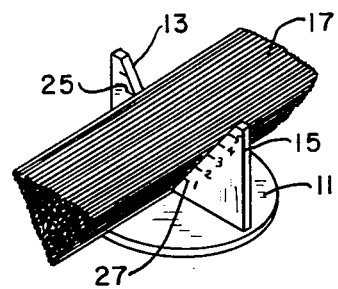
FIG.—1
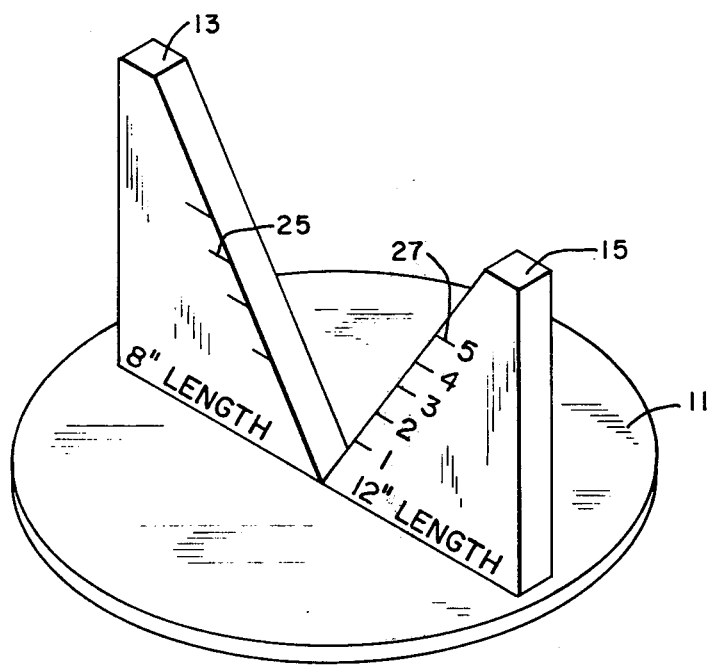
FIG.—2
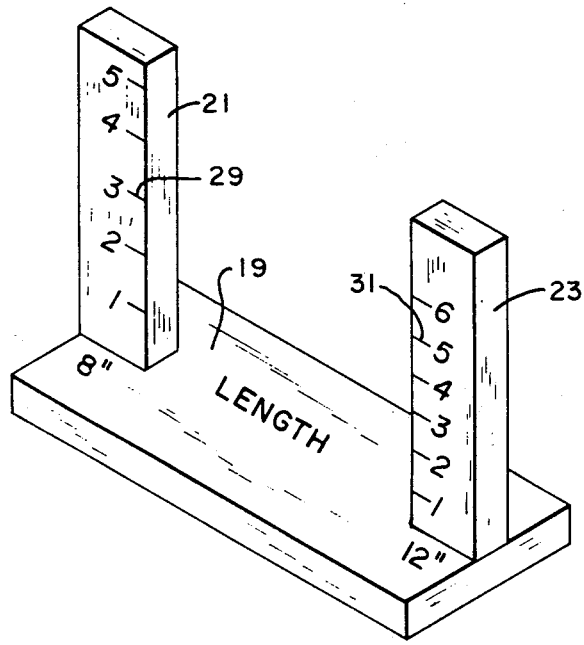
FIG.—3

MEASURING DEVICE FOR SPAGHETTI OR THE LIKE

BACKGROUND OF THE INVENTION

1. Field of the Invention

The present invention relates to a device for measuring spaghetti or the like.

2. Description of the Prior Art

There are no known devices particularly adapted for the measurement of spaghetti or other elongated noodles prior to cooking. At present, one must make a visual or manual estimation of the quantity of uncooked spaghetti or other noodles which will, when cooked, be an appropriate serving. Such an estimation is subject to error because of the changes in volume and rigidity of the noodles caused by cooking, frequently resulting in a smaller or larger serving of cooked noodles than desired.

The instant invention overcomes this error by providing a device which enables one to measure objectively the quantity of uncooked spaghetti which will when cooked equal the desired serving amount.

SUMMARY OF THE INVENTION

The present invention is a device for measuring spaghetti or the like. It is comprised of a base member and a pair of upright support means secured to the base member. Also provided are indicia disposed on the support members. Hard spaghetti sticks or other noodles placed on the base member are supported vertically by the upright members and the amount of spaghetti can be determined by comparing the top of a level pile of noodles with the corresponding indicia on the support members.

OBJECTS OF THE INVENTION

It is therefore an important object of the present invention to provide a device for the measurement of amounts of hard spaghetti or the like.

It is another object of the invention to provide a device which can be used to measure spaghetti sticks or other noodles of various lengths.

It is a further object of the invention to provide a device which reduces the error and possible waste which may result from subjectively estimating an amount of uncooked spaghetti or other noodles.

And it is yet another object of the invention to provide a convenient device for the determination of an amount of uncooked spaghetti or the like which will after cooking be an appropriate serving amount.

Other objects and advantages of the invention will become apparent when it is considered in conjunction with the accompanying drawings described hereinafter.

DESCRIPTION OF THE DRAWINGS

FIG. 1 is a perspective view of one embodiment of the present invention showing a quantity of spaghetti disposed thereon.

FIG. 2 is a detailed perspective view of the embodiment of the invention shown in FIG. 1.

FIG. 3 is a perspective view of a second embodiment of the invention.

DESCRIPTION OF THE PREFERRED EMBODIMENT

The present invention is a device particularly adapted for measuring spaghetti or other straight stackable noodles. Referring to the drawings and particularly to FIG. 1, the invention comprises a base member 11 to which are secured upright means 13 and 15 in such a manner that the means 13 and 15 support vertically hard spaghetti or other noodles 17 placed on the base member between the upright means. When the term spaghetti is utilized, that term is meant to include any noodles that may be stacked and measured. The quantity of said noodles can be measured by comparison of the top of the pile of the noodles 17 with indicia 25 or 27 disposed on the upright means. In the preferred embodiment of FIG. 2 the base member 11 has a generally planar horizontally disposed upper surface for supporting the spaghetti or noodles. In the preferred embodiment the base member has a generally circular configuration. FIG. 3 portrays a second preferred embodiment in which base member 19 is generally rectangular in form whereby hard spaghetti or other noodles placed on said base member between vertical members 21 and 23 are more fully supported thereby.

Referring to FIGS. 1 and 2 the upright members 13 and 15 are perpendicularly disposed to base member 11 and secured thereto such that upright member 13 is disposed in the same vertical plane as member 15. In the embodiment shown in FIGS. 1 and 2 the opposed faces of said upright members are angled with respect to each other generally forming a V in the vertical plane. Hard spaghetti or other noodles 17 placed on base member 11 between upright members 13 and 15 as illustrated in FIG. 1 are supported thereby and the top of the pile of noodles can be compared to indicia disposed on the upright members. In the preferred embodiment shown in FIG. 3, the opposed faces of upright members 21 and 23 are disposed vertically parallel to each other and perpendicular to base member 19. Hard spaghetti or other noodles placed on base 19 between upright members 21 and 23 in a manner similar to that illustrated in FIG. 1 are supported and can be measured by comparison of the level top of the pile with indicia 29 or 31.

The indicia 25, 27, 29 and 31 provided are graduated markings disposed on the faces of upright members 13, 15, 21 and 23 respectively such that the number of individual average-sized servings of spaghetti or other noodles can be determined by placing the noodles on the base member 11 or 19 between the upright members and comparing the top of the level stack of noodles to the corresponding indicia. Indicia may be placed on the face of either or both upright members of the preferred embodiment. The indicia may be graduated so that noodles of various lengths may be measured by the same device. For purposes of illustration, the indicia used in FIGS. 1 through 3 are graduated for 8-inch and 12-inch long noodles. Indicia 25 in FIG. 2 and indicia 29 in FIG. 3 may be regularly spaced so that servings of 8-inch long spaghetti or other noodles can be measured. Indicia 27 in FIG. 2 and indicia 31 in FIG. 3 may be so graduated that servings of 12 inch long spaghetti or other noodles can be determined. However, it is understood that the indicia could be graduated so that any one length or any other combination of lengths of noodles could be measured in a similar manner.

The invention is very useful in that both experienced and novice spaghetti cookers can accurately predetermine the amount of spaghetti to cook for the number of persons to be served.

While the invention has been described in detail, it is not to be limited to the preferred embodiment set forth except as may be necessitated by the appended claims.

What I claim is:

1. A measuring device particularly adapted for measuring uncooked spaghetti or the like comprising
   a base member having a generally planar horizontally disposed upper surface wherein said base member is sized and shaped such that the hard spaghetti sticks or other noodles may be placed thereon and supported thereon substantially parallel to said upper surface,
   a pair of upright support members mounted on said base for permitting the spaghetti sticks or other noodles to be stacked vertically on said base between said members to at least the top thereof, and
   indicia disposed on at least one surface of at least one of said upright support members for indicating the number of individual servings of spaghetti or other noodles stacked upon said base.

2. The measuring device of claim 1 wherein there are indicia disposed on one surface of each of said upright support members, the indicia disposed on a surface of one of said upright support members, being graduated to measure 8-inch long sticks of spaghetti, and the indicia disposed on a surface of the other of said upright support members being graduated to measure 12-inch long sticks of spaghetti.

3. A measuring device particularly adapted for measuring uncooked spaghetti or the like comprising a base member and a pair of upright support members secured to said base member, said pair of upright support members having opposed faces angled with respect to each other wherein said base member and said pair of upright support members are formed to receive and support hard spaghetti sticks or other generally straight noodles in horizontally oriented positions in a vertically stacked arrangement between said pair of upright support members, said measuring device further comprising measuring indicia disposed on at least one surface of at least one of said upright members for indicating the amount of spaghetti or other noodles disposed between said upright support members.

* * * * *